(12) United States Patent
Wei et al.

(10) Patent No.: US 11,419,157 B2
(45) Date of Patent: Aug. 16, 2022

(54) WIRELESS COMMUNICATION USING SPATIAL REUSE

(71) Applicant: ZTE Corporation, Guangdong (CN)

(72) Inventors: Ning Wei, Guangdong (CN); Dan Yang, Guangdong (CN); Kaiying Lv, Guangdong (CN)

(73) Assignee: ZTE Corporation, Shenzhen (CN)

( * ) Notice: Subject to any disclaimer, the term of this patent is extended or adjusted under 35 U.S.C. 154(b) by 0 days.

(21) Appl. No.: 16/880,687

(22) Filed: May 21, 2020

(65) Prior Publication Data

US 2020/0288499 A1    Sep. 10, 2020

Related U.S. Application Data

(63) Continuation of application No. PCT/CN2017/112127, filed on Nov. 21, 2017.

(51) Int. Cl.
*H04W 4/00* (2018.01)
*H04W 74/08* (2009.01)

(52) U.S. Cl.
CPC .................. *H04W 74/085* (2013.01)

(58) Field of Classification Search
CPC ............... H04W 16/02; H04W 74/085; H04W 72/1278; H04W 74/0808; H04W 16/10
USPC ...................... 370/328, 329, 310.2
See application file for complete search history.

(56) References Cited

U.S. PATENT DOCUMENTS

| 2011/0116489 A1* | 5/2011 | Grandhi | H04W 16/04 370/338 |
|---|---|---|---|
| 2016/0066257 A1* | 3/2016 | Liu | H04W 74/0808 370/329 |
| 2016/0127909 A1* | 5/2016 | Huang | H04L 5/0062 370/329 |
| 2016/0128074 A1* | 5/2016 | Huang | H04W 52/18 370/329 |
| 2016/0301491 A1* | 10/2016 | Porat | H04L 27/2602 |
| 2017/0078891 A1* | 3/2017 | Cariou | H04W 16/10 |
| 2017/0079059 A1* | 3/2017 | Li | H04W 16/02 |
| 2017/0079068 A1* | 3/2017 | Ahmed | H04W 74/0816 |
| 2017/0118725 A1* | 4/2017 | Chu | H04W 72/0473 |
| 2017/0311329 A1* | 10/2017 | Barriac | H04W 74/0808 |
| 2017/0325222 A1* | 11/2017 | Cariou | H04W 72/0446 |

(Continued)

FOREIGN PATENT DOCUMENTS

| CA | 2781071 A1 * | 5/2011 | ........ H04W 36/0016 |
|---|---|---|---|
| CA | 2800867 A1 * | 12/2011 | ............. G06F 17/10 |

(Continued)

OTHER PUBLICATIONS

International Search Report and Written Opinion dated Jun. 22, 2018 for International Application No. PCT/CN2017/112127, filed on Nov. 21, 2017 (12 pages).

(Continued)

*Primary Examiner* — Mahendra R Patel
(74) *Attorney, Agent, or Firm* — Perkins Coie LLP (57) ABSTRACT

Techniques for performing wireless communication using spatial reuse are described. One exemplary wireless communication method comprises including, in a wireless packet, a parameter for controlling a number of wireless devices permitted for spatial reuse, and performing a transmission using the wireless packet. The method may be implemented by a wireless device that includes a processor.

20 Claims, 8 Drawing Sheets

(56) References Cited

U.S. PATENT DOCUMENTS

| | | | | |
|---|---|---|---|---|
| 2018/0184451 A1* | 6/2018 | Vannithamby | ...... | H04W 74/006 |
| 2019/0021007 A1* | 1/2019 | Zhou | ...................... | H04W 16/02 |
| 2019/0380038 A1* | 12/2019 | Bang | ...................... | H04W 16/02 |
| 2020/0127877 A1* | 4/2020 | Aio | ........................ | H04L 5/0053 |
| 2021/0014853 A1* | 1/2021 | Wang | .................. | H04W 72/042 |
| 2021/0168044 A1* | 6/2021 | Ogawa | ................ | H04L 41/0645 |

FOREIGN PATENT DOCUMENTS

| | | | | | |
|---|---|---|---|---|---|
| CA | | 2779993 A1 * | 12/2013 | ........... | G06F 9/5083 |
| CN | | 102869049 A | 1/2013 | | |
| WO | WO-2015081169 A1 * | 6/2015 | ............ | H04W 16/14 |
| WO | | 2017/171531 A1 | 10/2017 | | |
| WO | WO-2018029620 A1 * | 2/2018 | ............ | H04W 36/06 |

OTHER PUBLICATIONS

Extended European Search Report for European Patent Application No. 17932586.5, dated Jan. 13, 2021 (12 pages).
First Examination Report for Indian Patent Application No. 202047024187, dated Nov. 10, 2021 (7 pages).
Partial Supplementary European Search Report for European Patent Application No. 17932586.5, dated Sep. 25, 2020 (14 pages).

\* cited by examiner

SIGA_1: | FORMAT (B0) | BSS COLOR (B1-B6) | SPATIAL REUSE (B7-B22) | RESERVED (B23) | BANDWIDTH (B24-B25) |

SIGA_2: | TXOP (B0-B6) | RESERVED (B7-B15) | CRC (B16-B19) | TAIL (B20-B25) |

FIG. 2B

SIGA_1: | FORMAT (B0) | BSS COLOR (B1-B6) | SPATIAL REUSE (B7-B22) | RESERVED (B23) | BANDWIDTH (B24-B25) |

SIGA_2: | TXOP (B0-B6) | PARAMETER (B7-B8) | RESERVED (B9-B15) | CRC (B16-B19) | TAIL (B20-B25) |

| Value | Meaning |
|---|---|
| 0 | RESERVED |
| 1 | VALUE_1 |
| 2 | VALUE_2 |
| ... | ... |
| 12 | VALUE_12 |
| 13~15 | RESERVED |

FIG. 3

| Value | Meaning |
|---|---|
| 0 | SRP_DISALLOWED |
| 1-12 | RESERVED |
| 13 | SR_RESTRICTED |
| 14 | SR_DELAY |
| 15 | SRP_AND_NON_SRG_OBSS-PD_PROHIBITED |

FIG. 4A

| Value | Meaning |
|---|---|
| 0 | SRP_DISALLOWED |
| 1 | VALUE_1 |
| 2 | VALUE_2 |
| ... | ... |
| 12 | VALUE_12 |
| 13 | SR_RESTRICTED |
| 14 | SR_DELAY |
| 15 | SRP_AND_NON_SRG_OBSS-PD_PROHIBITED |

| SRP_DISAL LOWED (B0) | NON_SRGOB SS_PD DISALLOWE D (B1) | NONSRG OFFSET PRESENT (B2) | SRG INFORMATION PRESENT (B3) | HE SPATIAL REUSE_VAL UE15_ALLO WED (B4) | RESERVED (B5-B7) |

FIG. 5B

| SRP_DISAL LOWED (B0) | NON_SRGO BSS_PD DISALLOWE D (B1) | NONSRG OFFSET PRESENT (B2) | SRG INFORMATIO N PRESENT (B3) | HE SPATIAL REUSE_VAL UE15_ALLO WED (B4) | PARAM ETER (B5-B6) | RESERVE D (B7) |

WIRELESS COMMUNICATION USING SPATIAL REUSE

CROSS REFERENCE TO RELATED APPLICATIONS

This patent document is a continuation of and claims benefit of priority to International Patent Application No. PCT/CN2017/112127, filed on Nov. 21, 2017. The entire content of the before-mentioned patent application is incorporated by reference as part of the disclosure of this application.

TECHNICAL FIELD

This patent document generally relates to systems, devices, and techniques for wireless communications.

BACKGROUND

Wireless communication technologies are moving the world toward an increasingly connected and networked society. The rapid growth of wireless communications and advances in technology has led to greater demand for capacity and connectivity. Other aspects, such as energy consumption, device cost, spectral efficiency, and latency are also important to meeting the needs of various communication scenarios. In comparison with the existing wireless networks, next generation systems and wireless communication techniques need to support much deeper coverage and huge number of connections.

SUMMARY

This document relates to methods, systems, and devices related to digital wireless communication. Some implementations of the disclosed technology provide a method and apparatus for data transmission. The examples for implementing the data transmission technologies include effectively controlling or reducing interference from different stations (STAs) in one or more overlapping basic service sets (OBSSs) when one or more STAs in the OBSSs are transmitting data based on spatial reuse of medium resources.

In one example aspect, a wireless communication method is provided. The method comprises including, in a wireless packet, a parameter for controlling a number of wireless devices permitted for spatial reuse; and performing a transmission in the wireless communication network using the wireless packet. In some implementations, the parameter or a function of the parameter indicates a possibility of random access to medium resources for spatial reuse. In some implementations, the exemplary function of the parameter is expressed as "C×the parameter+D," where both C and D are constant coefficients; other functions or mappings are also possible. In some implementations, the possibility may be expressed as one or more of forms including a threshold, a probability, a media access control (MAC) address or ID information.

In some implementations, the ID information includes one or more of a basic service set (BSS) ID, BSS color, association ID, partial association ID, or group ID. In some implementations, the parameter probabilistically controls the number of wireless devices permitted for spatial reuse in the wireless communication network. In some implementations, the method is performed by an access point (AP) or a non-AP station. In some implementations, the method further comprises determining the parameter by selecting from a set of pre-defined values. In some implementations, the method further comprises determining the parameter, by acquiring the parameter from another transmission. In some implementations, the performing of the wireless transmission includes transmitting the wireless packet on an overlapping part of an overlapping basic service set.

In another aspect, a method of wireless communication is provided. The method comprises receiving, in a wireless packet, a parameter for controlling the number of wireless devices permitted for spatial reuse in a wireless communication network, obtaining a constraint parameter and a local parameter, selectively performing, based on a comparison between the constraint parameter and the local parameter, a wireless transmission by spatially reusing medium resources. In some implementations, the constraint parameter is the parameter or a function of the parameter. In some implementations, the local parameter is obtained from a predefined set of possible parameter values. In some implementations, the obtaining of the local parameter includes generating a random number within in a range [0, N] where N is equal to or greater than zero. In some implementations, the obtaining of the local parameter includes obtaining a random value used for a back-off procedure. In some implementations, the method is performed by a non-AP station or AP. In some implementations, the parameter probabilistically controls the number of wireless devices for special reuse.

In yet another aspect, a method of wireless communication is provided. The method includes performing, by a wireless device, during a back-off procedure, clear channel assessment using a signal level threshold that is in relation to an amount of time elapsed from a start of a back-off; and selectively performing a wireless transmission based on a result of the clear channel assessment. In some implementations, the signal level threshold decreases as the amount of time elapsed from the start of the back-off increases. In some implementations, the signal level threshold linearly decreases as the amount of time elapsed from the start of the back-off increases. In some implementations, the signal level threshold non-linearly decreases as the amount of time elapsed from the start of the back-off increases. In some implementations, wherein the performing clear channel assessment includes measuring an amount power in a frequency band, and comparing with the signal level threshold, wherein the signal level threshold is adjusted by an amount that is equal to a sum of an initial signal level threshold and a dynamic portion related to the number of time slots elapsed. In some implementations, the selectively performing the wireless transmission comprises performing the wireless transmission when clear channel assessment indicates absence of transmissions.

DETAILED DESCRIPTION

The disclosed technology provides implementations and examples of data transmission to effectively control or reduce interference that is caused by the spatial reuse of channel resources in a wireless local area network (WLAN).

With the rapidly increasing density of WLAN deployments and the huge popularity of Wi-Fi enabled devices, many efforts have been made for spatial reuse optimization. For example, 802.11ax, also called High-Efficiency Wireless (HEW), has the challenging goal of improving the average throughput per user by a factor of at least 4× in dense user environments. This new standard focuses on implementing mechanisms to serve more users a consistent and reliable stream of data (average throughput) in the presence of many other users. To improve the system level performance and the efficient use of spectrum resources in dense deployment scenarios, the 802.11ax standard implements a spatial reuse technique. The objective of HE (High efficiency, HE) spatial reuse technique is to allow the medium to be reused more often between overlapping basic service sets (OBSSs) in dense deployment scenarios by the early identification. For example, when a sender sends a PPDU (PLCP protocol data unit) to a receiver in WLAN, the receiver can identify in advance the received PPDU is from adjacent OBSS based on the BSS color or other information in the preamble or PHY header of signals from OBSSs and interference management.

Figure 1:
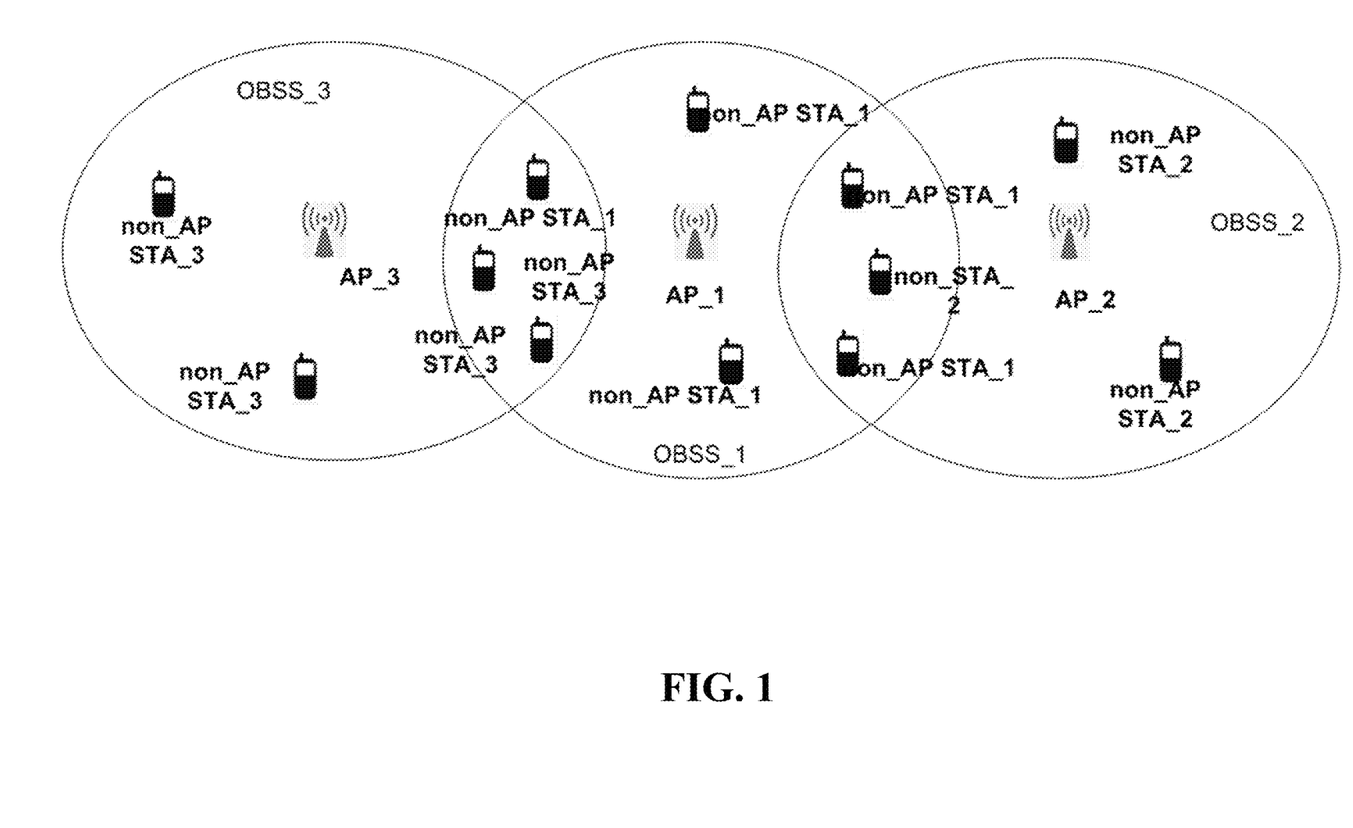
FIG. 1 shows an exemplary WLAN network comprising multiple OBSSs.

FIG. 1 shows an exemplary WLAN network comprising multiple OBSSs. As shown in FIG. 1, an access point (AP) and multiple non-AP stations (non-AP STAs) associated with the AP constitutes a BSS. Coverage between multiple BSSs is overlapping and the overlapping BSS is referred to as OBSS (overlapping BSS). The OBSS transmissions using spatial reuse are implemented to improve the system level performance and the efficient use of the resources. There are two independent spatial reuse modes, one called OBSS_PD-based (Packet Detection, PD) spatial reuse and the other called SRP-based (Spatial Reuse Parameter, SRP) spatial reuse. In conventional technology, when the number of STAs who implement the spatial reuse operation simultaneously is beyond a certain value, these superimposed reusing signals will interfere the on-going transmission and even result in the failure of the transmission of wireless packets. In order to avoid this situation, there have been suggested to impose some constraints on the transmitting power according to information gathered regarding the neighborhood. For example, AP can send an beacon request to associated STAs for obtaining information on the neighborhood.

Under the conventional technology, however, it is still difficult to completely stop the transmission of an STA which is about to reuse the occupied channel. Considering benefits of increasing the total throughput of a whole network, 802.11ax does not provide the option of closing the spatial reuse function. Thus, any STA in a neighbor OBSS can proceed the spatial reuse transmission, once it satisfies the requirements for the publication. For SRP-based case, the requirements can be found in the spatial reuse (SR) field in HE-SIG-A of HE TB (Trigger_based) PPDU preamble. For OBSS_PD-based case, the requirements have already been predetermined in the protocol. In light of the non-closing of the spatial reuse operation, the issues on the super imposed reusing signals still exist in the BSS transmission procedure using spatial reuse and data transmission techniques which can effectively control or reduce interference due to spatial reuse transmission are needed. The disclosed technology provide techniques to improve the procedure of the spatial reuse transmission and avoid a failure of receiving wireless data packets due to the superposed reusing signals in the network.

Transmission of Wireless Packet Including Parameter

Some implementations of the disclosed technology allow the selective transmission of a wireless packet. Some implementations of the disclosed technology provide a mechanism to perform a wireless transmission of a wireless packet including a parameter of controlling a spatial reuse function in a wireless communication network. The selective transmission of the wireless packet is achieved using the parameter included in the wireless packet. Specifically, the parameter may be carried in the PHY header or the preamble of the wireless packet. The parameter would limit the number of concurrent spatial reuse transmissions over the same wireless packet. In some implementations, the parameter would control a number of wireless devices permitted for spatial reuse in a wireless communication network. The parameter or a function of the parameter indicates a possibility of random access to medium resources for spatial reuse. The medium resources can refer to one or more of time resources, frequency resources, code resources, or beam resources. When multiple OBSS STAs who are hidden nodes to one another transmit the wireless packet including the parameter, the transmission of the wireless packet from multiple OBSS STAs is limited based on the parameter. The parameter may be expressed as one or more of the forms of a threshold, a probability, media access control (MAC) address or ID information. For example, the parameter will be used as a threshold to decide to perform the wireless transmission of the wireless packet and determined by AP or non-AP STAs. When the parameter is expressed in the form of ID information, the ID information includes one or more of BSS ID, BSS color, association ID, partial association ID, group ID, etc.

Figure 2A:
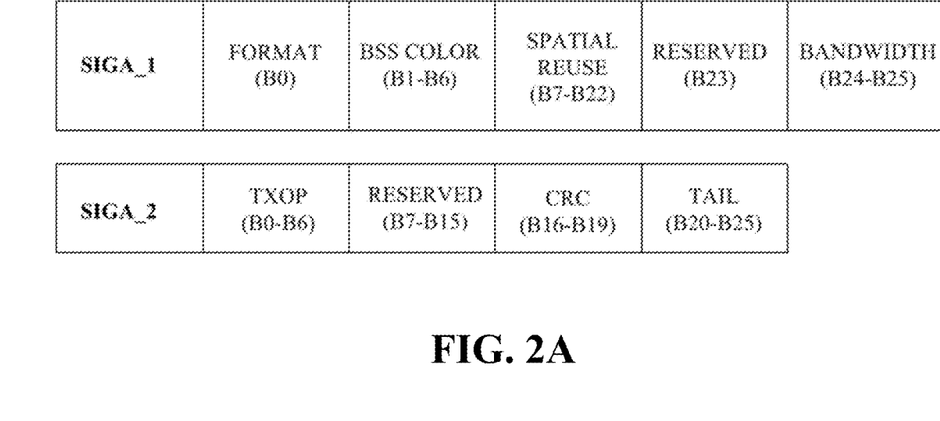
FIG. 2A shows signaling structure of a conventional PPDU.
Figure 2B:
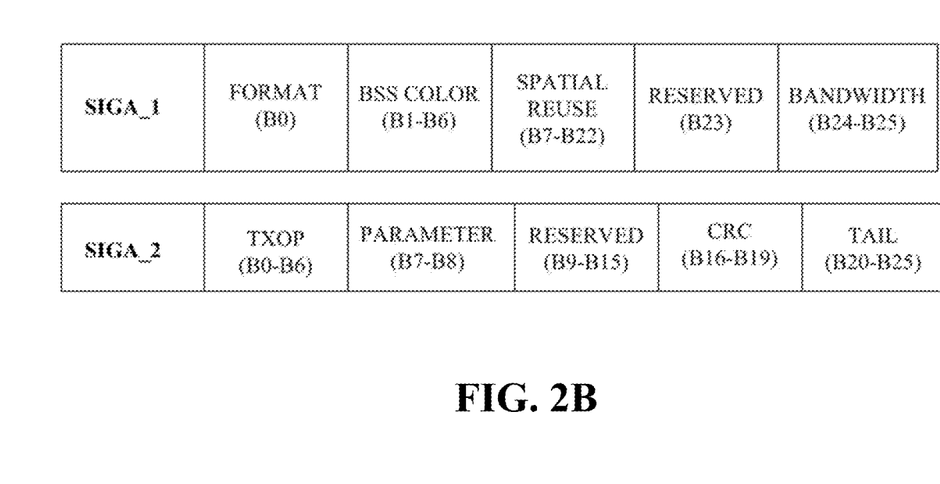
FIG. 2B shows exemplary signaling structure of a PPDU suggested in this patent document.
Figure 3:
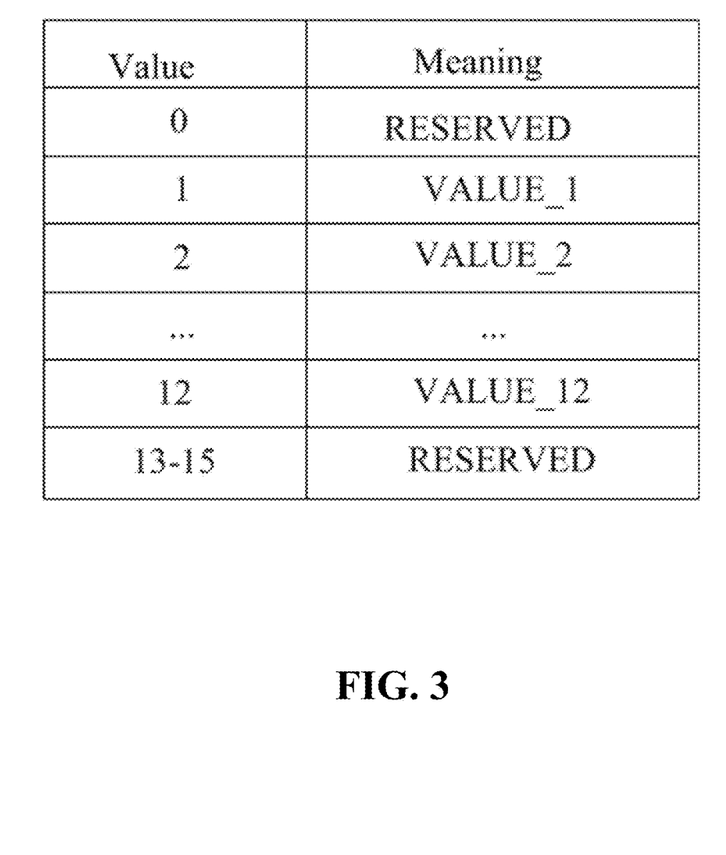
FIG. 3 shows a mapping table indicating a possible value of the parameter.

Implementations of the disclosed technology suggest to modify the wireless packet to include the parameter to control spatial reuse. For example, the parameter can indicate the number of wireless devices permitted for spatial reuse. The modification of the wireless packet can be made to various level of the wireless packet, for example, a PLCP (Physical Layer Convergence Procedure) Protocol Data Unit (PPDU). For example, the parameter may be carried in the preamble (or PHY header) of PPDUs transmitted by an AP or a non-AP STA associated to the AP, which can be reused by STAs in adjacent OBSS. FIG. 2A shows signaling structure of a conventional PPDU, and FIG. 2B shows exemplary signaling structure of a PPDU suggested in this patent document. A PPDU is a physical layer convergence protocol (PLCP) data unit and defined by the IEEE 802.11 standards. While there are various PPDU formats available in the IEEE 802.11 standards, FIGS. 2A and 2B show an example of HE-SIG-A of HE TB PPDU (High Efficiency Trigger-Based PPDU). The HE TB PPDU includes HE- SIG-A (High Efficiency Signal A) including SIGA_1 and SIGA_2. As compared with the signaling structure in FIG. 2A, the signaling structure in FIG. 2B includes the "PARAMETER" section in SIGA_2 of the HE-SIG-A field of HE TB PPDU. The implementation in FIG. 2B is provided as an example and thus other implementations are also possible to modify the PPDU in different manners to include "PARAMETER" section. For example, the parameter can be carried using different number of bits, different fields, or different levels of the wireless packet. In addition, although FIG. 2B shows that four bits B7 to B10 are assigned to the "PARAMETER" section, other implementations are also possible. In some implementations, the parameter may be selected from a set of pre-defined values. FIG. 3 shows a table indicating a possible value of the parameter. For example, the parameter represented with four bits may have a value corresponding to one of VALUE_1 to VALUE_12. Other VALUE sets are also possible. For example, the VALUE set may be {VALUE_1, VALUE_2, . . . , VALUE_10} or {VALUE_1, VALUE_2, . . . , VALUE_4} and the rest values are reserved or null. The VALUE set {VALUE_1, VALUE_2, . . . , VALUE_10} and {VALUE_1, VALUE_2, . . . , VALUE_4} may separately correspond to two arithmetic sequences, such as {0.1, 0.2, 0.3, . . . , 1} and {0.25, 0.5, 0.75, . . . , 1}. The possible value sets of the parameter are provided as an example only and other sequences or mapping relationships are also possible. The table has previously stored in the AP and the non-AP STAs in the OBSS.

In some implementations, the AP or non-AP STAs in an OBSS determine the value of the parameter based on network congestion and include the determined parameter in the wireless packet to be sent to another AP or non-AP STAs in the same OBSS or neighboring OBSSs. In some implementations, the parameter may be acquired from a beacon frame transmitted by the AP. There are different types of PPDUs, including DL (Down Link) PPDU, and UL (Up Link) PPDU. IEEE 802.11ax define four PHY formats, i.e., HE SU (Single User) PPDU, HE ER (Extendable Range) PPDU, HE MU (Multiple User) PPDU, and HE TB PPDU. HE SU PPDU and HE ER PPDU are used for UL and DL SU transmission, HE MU PPDU is used for DL MU transmission, and HE TB PPDU is used for UL MU transmission. Therefore, HE TB PPDU is an UL PPDU; and HE MU PPDU is a DL PPDU. Reusing UL and DL PPDUs are both allowed in IEEE 802.11ax. The SRP-based spatial reuse is applied for the HE TB PPDU and the OBSS_PD-based spatial reuse is allowed for all of the PPDUs mentioned above.

Depending on a type of the transmission and/or the frame, the parameter can be carried in various fields of the wireless packet. In some implementations, for the case of HE TB PPDU in 11ax (i.e., SRP_based spatial reuse), the parameter may be carried in the common info field of a trigger frame. After receiving the trigger frame transmitted by AP, the scheduled STAs can copy it to HE-SIG-A of HE TB PPDU where a new signaling field with L bits (where L is an integer and may be not greater than 9) should be added. Combining the parameter and spatial reuse (SR) info in HE-SIG-A of HE TB PPDU, the OBSS STA can determine whether to transmit PPDU or not. For cases of HE SU PPDU, HE ER PPDU, HE MU PPDU in 11ax (i.e., OBSS_PD-based spatial reuse), the parameter may be carried in the spatial reuse field.

Figure 4A:
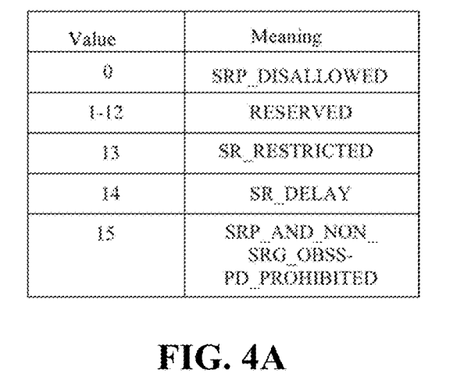
FIG. 4A shows a value of a conventional spatial reuse field.
Figure 4B:
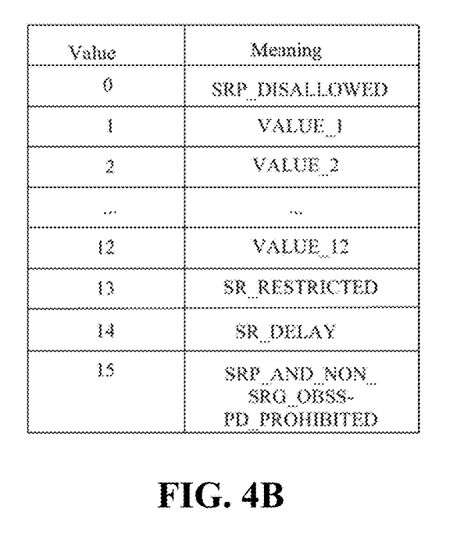
FIG. 4B shows a value of exemplary spatial reuse field suggested in this patent document.

FIG. 4A shows a value of a conventional spatial reuse field, and FIG. 4B shows a value of exemplary spatial reuse field suggested in this patent document. The conventional spatial reuse field shown in FIG. 4A includes the reserved values 1-12 which is a four-bit field. Some implementations of the disclosed technology suggest the modification of the conventional spatial reuse field to show the possible values for the parameter. Referring to FIG. 4B, the exemplary spatial reuse field suggested in this patent document includes possible values for the parameter. For example, the reserved values 1-12 in the conventional spatial reuse field are modified to show possible values for the parameter. By modifying the reserved values to the values for the parameter, the occurring of strong interference can be avoided probabilistically.

Figure 5A:
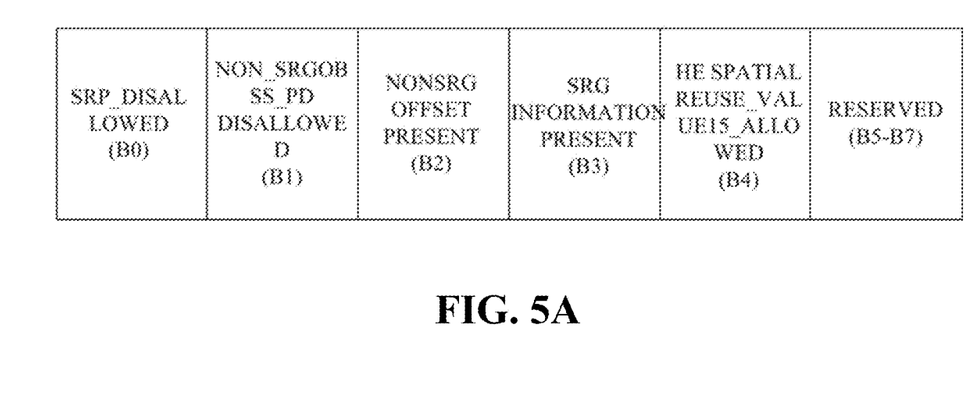
FIG. 5A shows a conventional spatial reuse control field in beacon frame.
Figure 5B:
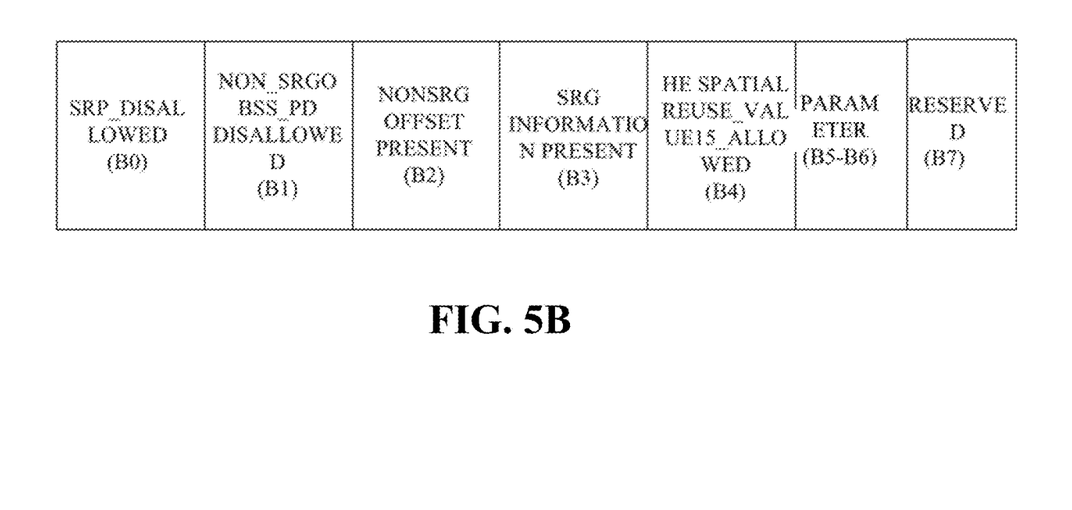
FIG. 5B shows a modified spatial reuse control field in beacon frame.

For cases of UL HE SU PPDU and UL HE ER PPDU, a non-AP STA may configure the parameter by itself, or be informed by AP. For the latter, the parameter may be acquired from another transmission in the wireless communication network. For example, the parameter may be acquired from the spatial reuse parameter set element of beacon frame. For the case of HE TB PPDU, the another transmission may refer to transmit a trigger frame. FIG. 5A shows a conventional spatial reuse control field in beacon frame, and FIG. 5B shows an exemplary beacon frame including a modified spatial reuse control field. As shown in FIGS. 5A and 5B, the bits B5 and B6, which were used for the reserved values in the conventional spatial reuse control field in beacon frame, are modified to indicate the parameter in the modified spatial reuse control field of the beacon frame. In some implementations, the parameter is carried by a dedicated 8-bit field in the beacon frame or in the spatial reuse parameter set element of the beacon frame.

Figure 6:
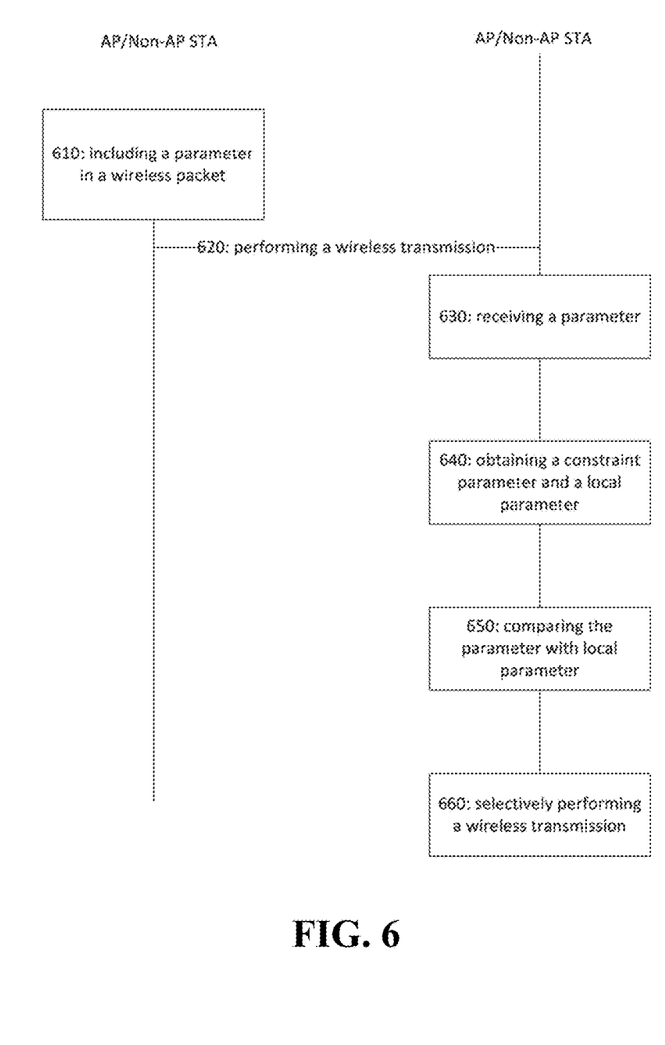
FIG. 6 shows an exemplary flowchart illustrating a wireless packet transmission using a parameter.

FIG. 6 shows an exemplary flowchart illustrating a wireless packet transmission using a parameter. As shown in FIG. 6, at block 610, an AP or non-AP STA in an OBSS includes a parameter in a wireless packet. As discussed above, some implementations of the disclosed technology provide a mechanism to perform a transmission of a wireless packet including a parameter of controlling a spatial reuse function in a wireless communication network. The parameter would limit the number of concurrent spatial reuse transmissions over the same wireless packet. In some implementations, the parameter would control a number of wireless devices permitted for spatial reuse in a wireless communication network. The parameter or a function of the parameter indicates a possibility of random access to medium resources for spatial reuse. The medium resources can refer to one or more of time resources, frequency resources, code resources, or beam resources. In some implementations, the possibility is expressed as one or more of forms including a threshold, a probability, a media access control (MAC) address or an ID information. In some implementations, the ID information includes one or more of a basic service set (BSS) ID, a BSS color, an association ID, a partial association ID, or a group ID. In some implementations, the parameter probabilistically controls the number of wireless devices permitted for spatial reuse in the wireless communication network. In some implementations, the method is performed by an access point (AP) or a non-AP station. In some implementations, prior to the including of the parameter in the wireless pact at block 610, the AP or non-AP STA may determine the parameter by selecting from a set of pre-defined values. In some other implementations, the AP or non-AP STA may determine the parameter by acquiring the parameter from another transmission in the wireless communication network.

At block 620, the AP or non-AP STA in the OBSS performs the transmission of the wireless packet including the parameter to another AP or another non-AP STA in the same or different OBSS. The wireless packet including the parameter is received by another AP or another non-AP STA. At block 630, another AP or another non-AP STA receives the parameter from the wireless packet. At block 640, another AP or another non-AP STA obtains a constraint parameter and a local parameter. Although FIG. 6 shows that the constraint parameter and the local parameter are obtained at one operation, other implementations are also possible. For example, the local parameter can be obtained after the constraint parameter is obtained. In some implementations, the parameter from the wireless packet, the constraint parameter, the local parameter can be concurrently obtained. The local parameter may be determined by the AP or non-AP station. The local parameter is to be compared with the received parameter to determine whether to perform the wireless transmission of the wireless packet. In some implementations, the local parameter is obtained from a predefined set of possible parameter values. In some implementations, the constraint parameter is the parameter or a function of the parameter. In some implementations, the obtaining of the local parameter includes generating a random number within in a range [0, N], where N is equal to or greater than zero. In some implementations, the obtaining of the local parameter includes obtaining a random value used for a back-off procedure. The local parameter can have a random value or a fixed value.

The AP or the non-AP STA which receives the wireless packet would find whether the local parameter satisfies some certain conditions. For example, some conditions may be whether the local parameter is greater than the parameter or other values generated based on the parameter. Some conditions may be whether the local parameter is smaller than the parameter or other value generated based on the parameter. Some conditions may be whether the local parameter falls within a fixed range of value. FIG. 6 shows the exemplary implementation comparing the parameter in the wireless packet with the local parameter at block 650. If it is determined that the local parameter satisfies certain conditions, for example, that the local parameter is smaller than the parameter, the AP or the non-AP STA is allowed to reuse the received wireless packet under the conditions that other requirements are met as well. In OBSS_PD spatial reuse, the other requirement is that CCA level is the OBSS_PD energy level which is inverse proportional to the received signal strength in a fixed range. In SRP-based spatial reuse, it's that the transmitting power is not beyond the indicated level by AP. If it is determined that the local parameter does not satisfy certain conditions, the AP or non-AP STA is not allowed to reuse the received wireless packet. At block 660, the AP or non-AP STA selectively performs the wireless transmission of the wireless packet based on the comparison between the parameter and the local parameter.

The selective transmission of the wireless packet using the parameter allows an option not to transmit the wireless packet when there are too many APs and/or non-AP STAs which simultaneously implement the spatial reuse operation. When there are too many APs and/or non-AP STAs, the superimposed reusing signals interfere the ongoing transmission and even result in the failure of receiving transmitted wireless packets. By including the parameter in the wireless packet, the AP or the non-AP STA can determine based on the parameter whether to transmit the wireless packet. Thus, it is possible to avoid the strong interference in dense deployment scenarios and prevent the failure of wireless packet transmission.

Selective Transmission of Wireless Packet Based on Clear Channel Assessment

The disclosed technology provides implementations to limit a number of STAs reusing channel resources based on Clear Channel Assessment (CCA). For example, there is provided a mechanism to perform CCA during a back-off procedure using a dynamically adjusted signal level threshold. According to the suggested mechanism, the back-off time can be regarded as one of multiple factors changing the accessing opportunity using the spatial reuse function. The accessing opportunity has a smaller probability as back-off time is longer and the accessing opportunity has a greater probability as back-off time is shorter.

Figure 7:
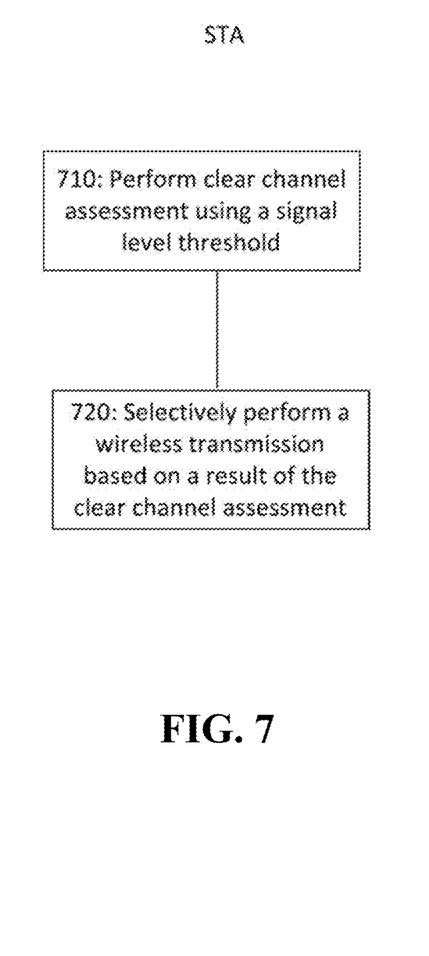
FIG. 7 shows an exemplary flowchart illustrating a selective transmission of wireless packet based on clear channel assessment.

Prior to an example of a selective transmission, the back-off procedure is started. The back-off procedure for OBSS spatial reuse transmission of STA is started under some predetermined conditions, for example, when there exists another station using the channel in the OBSS. FIG. 7 shows an exemplary flowchart illustrating a selective transmission of wireless packet based on clear channel assessment. At block 710, the STA performs the CCA using a signal level threshold. At block 720, the STA selectively performs the transmission based on the result of the CCA. As discussed above, it is noted that the accessing opportunity has a smaller probability as back-off time is longer and the accessing opportunity has a greater probability as back-off time is shorter. Thus, the signal level threshold is expressed as a function or mapping related to an amount of time elapsed from the start of the back-off procedure. Various techniques can be implemented to count the time elapsed from the start of the back-off procedure. In some implementations, the back-off procedure includes starting an OBSS spatial reuse transmission back-off counter. In some implementations, the back-off procedure includes setting the value of an OBSS timer according to time information carried in the received wireless frame.

In some implementations, the signal level threshold is adjusted to decrease as the amount of time elapsed from the start of the back-off increases. The decrease of the signal level threshold can be linear or non-linear in relation to the amount of time elapsed. The equation below shows an exemplary signal level threshold decreasing with the increase of time elapsed from the start of the back-off.

$$CCA\_Level_{new} = CCA\_Level_{baseline} + \Delta(time\_slot, \ldots) \quad \text{Eq. (1)}$$

where the time_slot as one of input parameters of delta function is the number of time slots which the STA has backed off (or the remaining number of time slots).

In some implementations, the delta may be a linear function as expressed below:

$$\Delta(time\_slot) = A \times time\_slot + B \quad \text{Eq. (2)}$$

In some implementations, the delta may be a non-linear function as expressed below:

$$\Delta(time\_slot) = A \times \log(time\_slot) + B, \text{ or}$$

$$\Delta(time\_slot) = A \times \frac{1}{time\_slot} + B$$

where A and B are constant coefficients.

In some implementations, a mapping table or other forms expressing the relationship between the signal level threshold and the amount of time elapsed are also possible.

In some implementations, the performing of the clear channel assessment includes measuring an amount power in a frequency band, and comparing with the signal level threshold, wherein the signal level threshold is adjusted by an amount that is equal to a sum of an initial signal level threshold and a dynamic portion related to the number of time slots elapsed. In some implementations, the selectively performing the wireless transmission comprises performing the wireless transmission when CCA indicates absence of transmissions.

The implementations of the selective transmission using the signal level threshold that is a function of the amount of time elapsed from the start of the back-off allows to define a different CCA level for each time slot, thereby filtering more portions of STAs from spatial reuse during the countdown of the back off procedure.

Figure 8:
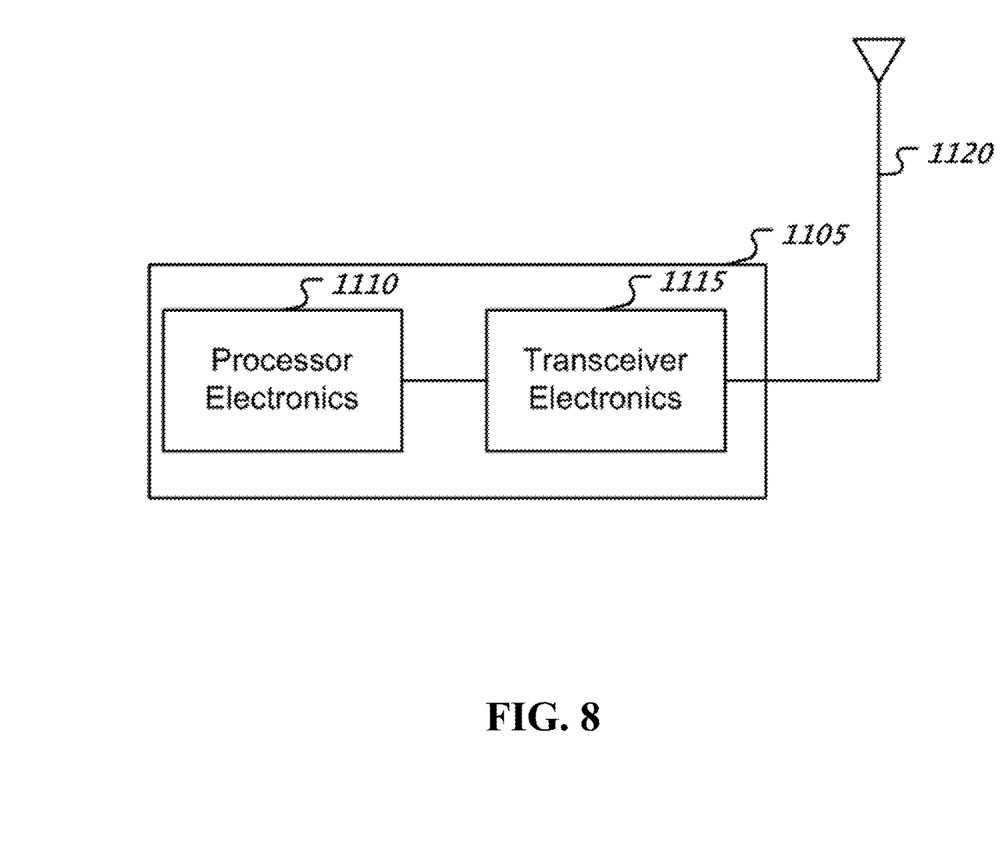
FIG. 8 shows an example of a wireless communication apparatus.

FIG. 8 is a block diagram representation of a portion of a radio station. A radio station 1105 such as an AP or a base station or a wireless device (or UE) can include processor electronics 1110 such as a microprocessor that implements one or more of the wireless techniques presented in this document. The radio station 1105 can include transceiver electronics 1115 to send and/or receive wireless signals over one or more communication interfaces such as antenna 1120. The radio station 1105 can include other communication interfaces for transmitting and receiving data. Radio station 1105 can include one or more memories (not explicitly shown) configured to store information such as data and/or instructions. In some implementations, the processor electronics 1110 can include at least a portion of the transceiver electronics 1115. In some embodiments, at least some of the disclosed techniques, modules or functions are implemented using the radio station 1105.

It will be appreciated by one of skill in the art that techniques for spatial reuse in wireless communication systems are disclosed.

From the foregoing, it will be appreciated that specific embodiments of the invention have been described herein for purposes of illustration, but that various modifications may be made without deviating from the scope of the invention. Accordingly, the invention is not limited except as by the appended claims.

The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is:

1. A wireless communication method, comprising:
receiving, by a station in a wireless communication network, a parameter included in a wireless packet for controlling a number of wireless devices permitted for spatial reuse in the wireless communication network;
obtaining, by the station, a constraint parameter whose value is determined based on the parameter and a local parameter whose value is determined separately from the parameter;
comparing, by the station, the constraint parameter with the local parameter; and
performing, by the station, a transmission of the wireless packet by spatially reusing medium resources in case that the local parameter satisfies a condition set based on the constraint parameter and skipping the wireless transmission of the wireless packet in case that the local parameter does not satisfy the condition;
wherein the local parameter is obtained from a predefined set of possible parameter values, or the local parameter is obtained from a random value used for a back-off procedure.

2. The method of claim 1, wherein the parameter or a function of the parameter indicates a possibility of random access to medium resources for spatial reuse.

3. The method of claim 1, wherein the possibility is expressed as one or more of forms including a threshold, a probability, a media access control (MAC) address or an ID information.

4. The method of claim 3, wherein the ID information includes one or more of a basic service set (BSS) ID, a BSS color, an association ID, a partial association ID, or a group ID.

5. The method of claim 1, wherein the parameter probabilistically controls the number of wireless devices permitted for spatial reuse in the wireless communication network.

6. The method of claim 1, wherein the method is performed by an access point (AP) or a non-AP station.

7. The method of claim 1, wherein the constraint parameter is the parameter or a function of the parameter.

8. The method of claim 1, wherein the obtaining of the local parameter includes generating a random number within in a range [0, N], where N is greater than 0.

9. The method of claim 1, further comprising:
performing a back-off procedure upon detecting another station using a channel in the wireless communication network;
performing, during the back-off procedure, clear channel assessment using a signal level threshold that is in relation to an amount of time elapsed from a start of a back-off.

10. The method of claim 9, wherein the signal level threshold decreases as the amount of time elapsed from the start of the back-off increases.

11. The method of claim 9, wherein the signal level threshold linearly decreases as the amount of time elapsed from the start of the back-off increases.

12. The method of claim 9, wherein the signal level threshold non-linearly decreases as the amount of time elapsed from the start of the back-off increases.

13. The method of claim 9, wherein the performing clear channel assessment includes measuring an amount power in a frequency band, and comparing with the signal level threshold, wherein the signal level threshold is adjusted by an amount that is equal to a sum of an initial signal level threshold and a dynamic portion related to the number of time slots elapsed.

14. The method of claim 9, wherein the performing the wireless transmission comprises performing the wireless transmission when clear channel assessment indicates absence of transmissions.

15. A wireless communication apparatus comprising a processor and a memory, wherein the processor is configured to read code from the memory comprising:
receiving a parameter included in a wireless packet for controlling a number of wireless devices permitted for spatial reuse in a wireless communication network;
obtaining a constraint parameter whose value is determined based on the parameter and a local parameter whose value is determined separately from the parameter;
comparing the constraint parameter with the local parameter; and
performing a transmission of the wireless packet by spatially reusing medium resources in case that the local parameter satisfies a condition set based on the constraint parameter and skipping the wireless transmission of the wireless packet in case that the local parameter does not satisfy the condition;
wherein the local parameter is obtained from a predefined set of possible parameter values, or the local parameter is obtained from a random value used for a back-off procedure.

16. The wireless communication apparatus of claim 15, wherein the parameter or a function of the parameter indicates a possibility of random access to medium resources for spatial reuse.

17. The wireless communication apparatus of claim 15, wherein the possibility is expressed as one or more of forms including a threshold, a probability, a media access control (MAC) address or an ID information.

18. The wireless communication apparatus of claim 15, wherein the ID information includes one or more of a basic service set (BSS) ID, a BSS color, an association ID, a partial association ID, or a group ID.

19. The wireless communication apparatus of claim 15, wherein the parameter probabilistically controls the number of wireless devices permitted for spatial reuse in the wireless communication network.

20. The wireless communication apparatus of claim 15, wherein the obtaining of the local parameter includes generating a random number within in a range [0, N], where N is greater than 0.

* * * * *